March 19, 1957 V. E. HANSON 2,785,928
CONVEYOR
Filed June 6, 1955
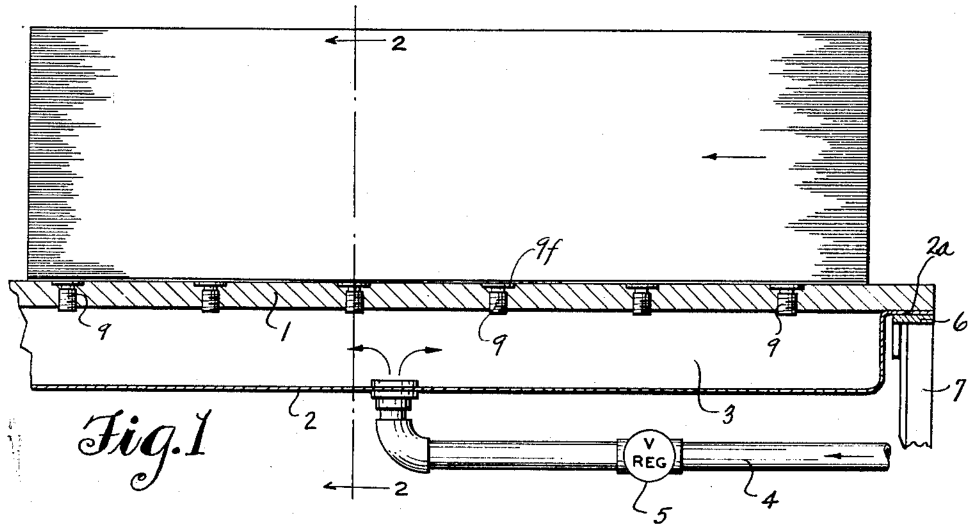
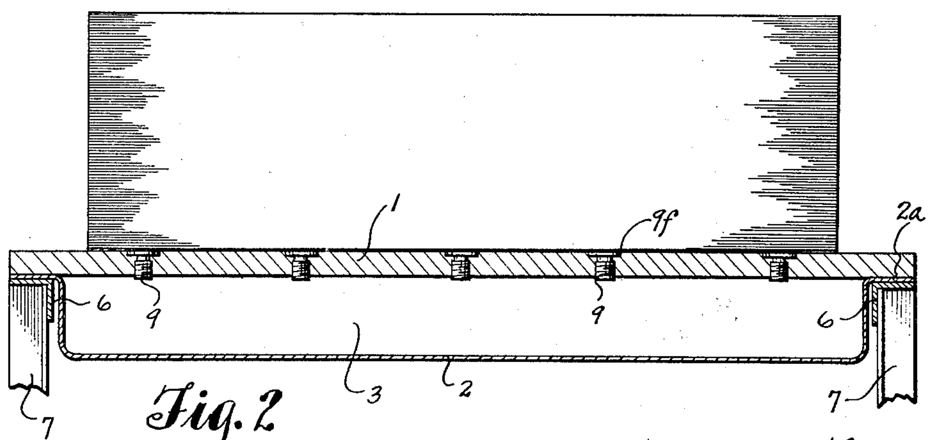
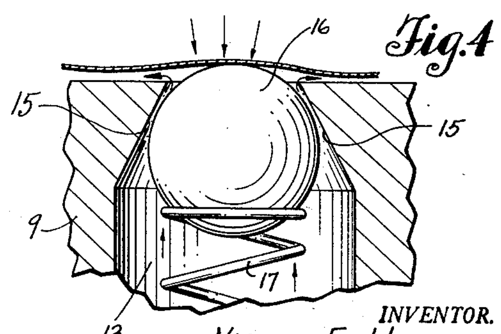
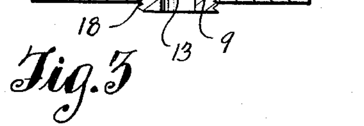
INVENTOR.
VICTOR E. HANSON
BY
Cook & Robinson
ATTORNEYS 2,785,928
Patented Mar. 19, 1957

2,785,928

CONVEYOR

Victor E. Hanson, Hoquiam, Wash., assignor to Lamb-Grays Harbor Co., Inc., Hoquiam, Wash., a corporation of Washington Application June 6, 1955, Serial No. 513,340

2 Claims. (Cl. 302—17)

This invention relates to improvements in conveyors and conveying surfaces, and it has reference more particularly to those particular types of conveyors having smooth, flat top surfaces upon which packages, bales, stacks of sheet material, and the like are adapted to be moved or conveyed while floatingly supported by cushions of air under pressure and automatically maintained between the under surface of the stacks or bales and the conveying surface.

The present invention is an improvement upon the invention disclosed in U. S. Patent No. 2,315,627 issued to George E. Lamb on April 6, 1943.

Heretofore, substantially flat, conveying surfaces of the above character have been quite successfully used for the easy moving of large bales of pulp, and stacks of semi-rigid sheet material; such surfaces being equipped at predetermined intervals of spacing, both transversely and longitudinally thereof, with valved orifices through which air under pressure was automatically admitted to the under surfaces of the bales or stacks as the latter were moved along the conveying surface. While this means and method of conveyance has been quite satisfactory where pulp bales or stacks of semi-rigid sheet material were being moved, it was found not satisfactory for the conveyance of unbound stacks of thin, flexible sheet material such as paper due to the fact that the lower sheets would invariably creep from beneath the stacks. Therefore, the successful use of this particular type of conveyor has heretofore been limited to the moving thereon of bales, or stacks of rigid or semi-rigid sheet material.

After many experiments and intensive investigation of the reasons for such "creeping" of the lower sheets of stacked material such as thin flexible paper, it was discovered to be due to the fact that when the air was forcibly discharged upwardly through the surface orifices against a flexible paper sheet, the suction that was created immediately above the orifice, caused the sheet to be drawn downwardly against the surface about the orifice thus resulting in sufficient drag on the sheet to cause it to gradually creep from beneath the stack. This result is in accordance with the teaching of Bernoulli's law which is well recognized by engineers in aerodynamics.

It is the primary object of this invention to provide a conveyor of the same general type as that of the Lamb patent previously mentioned, and having a substantially flat conveying surface for the floating support and movement thereon of unbound stacks of thin, flexible sheet material, such as paper, and to provide the conveyor surface with valved orifices through which air under pressure is automatically admitted to the under surfaces of the stacks as they are moved therealong for their floating support; the present invention being characterized by the use of low pressure air and in the novel features and design of the valve devices whereby the causes for the "creeping" of the lower sheets from the stacks, are eliminated.

More specifically stated, the objects of the present invention reside in the provision of an "air float" conveyor system, designed especially for the moving of unbound stacks of thin, flexible sheets of paper or the like, although not confined thereto, and characterized by use of "low pressure" air and improved air discharge orifice and valve mechanism in the conveying surface whereby the suction drag on the lower sheet of a moving stack is counteracted by the balancing upward pressure of springs that are associated with the air valves.

Further objects of the invention reside in the mode of application of low pressure air for floating support of the stacks, and in the details of construction, combination and coaction of parts of the valves which control the air, as will hereinafter be fully described.

In accomplishing these and other objects of the invention, I have provided the improved details of construction, the preferred forms of which are illustrated in accompanying drawings, wherein:

Fig. 1 is a vertical section taken longitudinally of a conveyor table embodying the improvements of the present invention therein.

Fig. 2 is a cross-section of the same, as seen on the line 2—2 in Fig. 1.

Fig. 3 is an enlarged sectional detail of one of the valved orifices of the conveyor surface.

Fig. 4 is a sectional detail of a part of the conveyor and valve, and indicating in a diagrammatic way, the flow of air from the valve and the tendency to draw the paper sheet down against the conveyor surface.

It is to be emphasized that the present improvements are designed primarily for the moving of unbound stacks of thin, flexible sheet material as distinguished from bales or stacked pulp sheets, cardboard or sheets of semi-rigid character.

Referring more in detail to the drawings:

1 designates a horizontally disposed plate, or table top, upon and along which stacks of flexible sheet material are to be conveyed, and 2 designates an air tight manifold that is fixed to the underside of the plate 1, and which extends substantially to its full width and length, thus forming an air pressure chamber 3 beneath plate 1. This chamber is adapted to be supplied with air under pressure, delivered thereinto from any suitable source of supply, through a pipe line 4. Suitable means, such as a pressure regulating valve 5 is interposed in the pipe line 4 to maintain even and constant air pressure in the chamber.

As here shown, the manifold 2 is formed about its top, peripheral edges with a horizontal flange 2*a* which flatly engages the underside of the plate 1 and is secured thereagainst, in an air tight joint by underlying angle bars 6. The table top, or plate 1 is here shown to be supported at suitable working height by legs 7 that are fixed to the angle bars 6.

Opening from the manifold chamber 3, upwardly through the plate 1 at such intervals of spacing, transversely and also longitudinally of the plate as found desirable or practical, are air passages, each being defined by a tubular valve housing 9. These housings are threaded downwardly through openings 10 formed through the plate to receive them. At its upper end, each valve housing 9 is formed with a flat peripheral flange 9*f* which is contained in a countersunk recess in the plate, flush with the top surface of the plate as shown in Fig. 3.

Opening axially through each valve housing 9 for the flow of air from the chamber 3 is a bore 13, formed at its upper end with a downwardly facing, conical seat 15, to which a small ball valve 16 is fitted; the ball being adapted to be yieldingly held seated by the upward pressure of air confined in the chamber 3. Also acting upwardly against the ball valve in each housing is a small coiled spring 17; this being contained in the bore 13 and supported upon a collar or ring 18 that is press fitted in the bore. The ball valve 16, when seated, projects slightly above the top surface of plate 1, and it is adapted to be unseated by the lowermost sheet of a stack of sheets passing thereover upon the conveying surface of plate 1. When a ball valve is unseated by a stack passing thereover, then air is discharged through the seat orifice to the undersurface of the stack. The air that is discharged from the several orifices that are beneath a stack as it is moved along the plate surface, will operate to floatingly support the stack for easy movement.

The present invention is based upon the use of low pressure air and in the disposition of air valves in the conveying surface in such number or spacing that a substantial number will always be covered by each stack as it is moved along the surface. In fact, air pressure is calculated on the basis of load per square inch on the conveyor, and is only slightly more than actually required to support the stack for easy movement. The lowering of the air pressure from what is now considered to be relatively high, as previously used, to the present relatively low pressure, reduces the amount of vacuum or suction produced immediately over each of the valve orifices accordingly. However, since such suction cannot be entirely eliminated, the pressure of the spring 17 against the ball valve associated with each orifice is adjusted to an amount that will just counteract the amount of suction created and thus will prevent the detrimental "drag" on the lower sheet and eliminate the "creep" that is so undesirable in the stack moving operation.

To accomplish the principal object of my invention, namely, eliminating creep when thin, light weight paper is conveyed, it is required that certain specific and essential modifications be made in construction of the valves, the spacing of the valves and in the amount of air pressure employed. It has been found necessary to have a specific relationship between the air pressure, the spacing of the valves, the size of the valves and the springs which support the valves. As a result of many years of experimenting and a trial and error approach, I have discovered that the desired result is obtainable by adhering to certain limitations.

In arriving at the present construction of the ball portion of the valve, I tried balls of various sizes and various materials. For the specific use in my invention, I have concluded that steel balls are most satisfactory. Aluminum balls oxidize and mark the paper. Nylon or other types of synthetic or plastic balls also produce greater marking of the paper and they cause greater friction and therefore tend to produce creep.

The steel balls are substantially smaller than those previously used in prior, similar types of conveyors. The present preferred size is approximately ¼ inch in diameter. However, the size may vary from $\frac{3}{16}''$ to $\frac{5}{16}''$. The valve orifice will also vary in diameter depending on the size of the ball. With a ¼" diameter ball the orifice may vary from $\frac{13}{64}''$ to $\frac{7}{32}''$. In prior, similar devices the balls employed were ½" in diameter. The reduction in size has several advantages. It permits the use of smaller or lighter springs to retain the balls in position and also the depression or movement of the ball required to open the valve to full capacity is substantially reduced. When using the smaller balls, the desired or required volume of air is released by a minimum movement of the ball. Minimizing the movement of the ball to open the valve also reduces the marking of the paper. It will be appreciated that as the ball is depressed the supporting spring is compressed thereby providing a more firm or rigid support for the ball and resulting increased pressure against the paper which engages the ball.

To produce the required results, it is necessary that a substantial volume of air be employed or utilized and that the air pressure be substantially reduced from that which has previously been used in similar devices. To maintain the volume of air, it is necessary to increase the number of valves in a given area. In conveyors presently in use, the volume of air employed is one-quarter cubic foot per minute per valve. These conveyors contain 1000 valves in each unit so that the volume of air per minute is 250 cubic feet. The volume of air will vary depending upon the weight of a stack passing over the conveyor surface and the number of valves and their spacing is determined by the particular type and weight of material to be handled.

Numerous experiments have been made relative to the spacing of the valves and from my experiments I have found that satisfactory results are obtainable when the valves are spaced within the range of 4½" centers to 8" centers. The closer spacing is required when the paper is extremely thin and flimsy. The greater spacing is practical when relatively heavier paper is conveyed. The weight of a given stack of paper does not vary the requirements within reasonable limits. Increased stack weight is overcome by greater opening of the valves so as to release a greater volume of air. After the average weight of the stacks to be conveyed is determined, it is then possible to determine the number of valves and spacing required to produce a sufficient volume of air to support the stacks.

The substantial reduction in the air pressure employed is an important feature both from the cost of operation and from the results produced. In prior, similar devices, the air pressure employed was approximately three pounds per square inch. In my new and improved construction it is possible to obtain the desired results utilizing air pressure within the range of ¾ to 1 pound per square inch. From the cost operation standpoint, this reduction in pressure reduces the horsepower required to produce the necessary volume by approximately one-third. Stated in another way, it is possible to produce sufficient volume at the lowered pressure with two-thirds of the power previously required. It is found that when the valves are spaced to provide sufficient volume of air, the use of additional air pressure is detrimental in that the balls are not as readily depressed so that paper is marked. Also when the pressure is increased no benefit is derived so that a substantial volume of air is wasted. It has been found impractical to reduce the air pressure below ¾ of a pound per square inch because it limits the size and weight of the stacks. However, when stacks of relatively light weight which cover a substantial area are conveyed, it may be desirable to even further reduce the air pressure employed.

The air pressure required is goverened by the stack weight or pressure in the area of the valve orifices. The air pressure must be sufficient to cause the air to escape or be released under a conveyed stack and thereby float the stack on a film of air between the stack and surface of the conveyor. The reduced air pressure also reduces the velocity of the air flow so that areas of vacuum surrounding the valve orifices are eliminated and therefore the conveyance of the stacks of thin paper may be accomplished without objectionable creep of the bottom sheets.

As a result of reducing the air pressure and yet maintaining the required volume of air to support the stacks, I have been able to convey stacks of thin, slick paper without creep or distortion of the stack. This is possible due to the elimination of vacuum or suction which has been created in the areas about the orifices when increased or greater pressures are used. It is now possible to use such conveying mechanisms in fields in which, heretofore, such devices had not been satisfactory.

Having thus described my invention, what I claim as new therein and desire to secure by Letters Patent is:

1. A conveyor for the moving of stacks of thin, flexible sheet material, said conveyor comprising a plate with a smooth, flat top surface on which stacks are adapted to be moved, said plate being formed with a plurality of air orifices opening upwardly therethrough, said orifices being spaced one from another on centers ranging from about 4½" to about 8", means for supplying air under pressure to said orifices, ball valve members controlling the flow of air upwardly through the orifices and adapted to be individually depressed by a stack in passing thereover for the discharge of air to the underside of the stack, a yieldable means acting upwardly against each ball valve member with a pressure designed to counter balance the drag on the lower sheet of the stack that results from the upward discharge of air through the orifice against the sheet, the diameter of said ball valve members being within the range of 3/16" to 5/16" and the air pressure employed being no greater than one pound per square inch.

2. A conveyor for the moving of stacks of thin, flexible sheet material thereon, said conveyor comprising a plate with a smooth, flat top surface on which the stacks are adapted to be moved, said plate being formed with a plurality of air orifices opening upwardly therethrough in such spacing across and longitudinally of the plate that a plurality of the orifices will be covered simultaneously by a stack as moved along the plate, said orifices being spaced on centers ranging from about 4½" to about 8", means for supplying air under pressure to each orifice, a ball valve member fitted to each orifice to be engaged and depressed by a stack in passing thereover whereby air is discharged to the underside of the stack, spring means acting upwardly against each ball valve to retain the ball valve in a normally closed position, said ball valve members being substantially ¼" in diameter and the air pressure employed being within the range of ¾ to one pound per square inch.

References Cited in the file of this patent

UNITED STATES PATENTS

| | | |
|---|---|---|
| 2,176,307 | Lamb | Oct. 17, 1939 |
| 2,315,627 | Lamb | Apr. 6, 1943 |
| 2,651,549 | Ross | Sept. 8, 1953 |